US011782429B2

(12) United States Patent
Sonderegger et al.

(10) Patent No.: US 11,782,429 B2
(45) Date of Patent: Oct. 10, 2023

(54) AUTOMATICALLY ADAPTING A PROGNOSTIC-SURVEILLANCE SYSTEM TO ACCOUNT FOR AGE-RELATED CHANGES IN MONITORED ASSETS

(71) Applicant: Oracle International Corporation, Redwood Shores, CA (US)

(72) Inventors: Richard P. Sonderegger, Dorchester, MA (US); Kenneth P. Baclawski, Waltham, MA (US); Guang C. Wang, San Diego, CA (US); Anna Chystiakova, Palo Alto, CA (US); Dieter Gawlick, Palo Alto, CA (US); Zhen Hua Liu, San Mateo, CA (US); Kenny C. Gross, Escondido, CA (US)

(73) Assignee: Oracle International Corporation, Redwood Shores, CA (US)

( * ) Notice: Subject to any disclaimer, the term of this patent is extended or adjusted under 35 U.S.C. 154(b) by 104 days.

(21) Appl. No.: 17/368,840

(22) Filed: Jul. 7, 2021

(65) Prior Publication Data
US 2023/0008658 A1   Jan. 12, 2023

(51) Int. Cl.
| G05B 23/02 | (2006.01) |
| G06N 20/00 | (2019.01) |
| G05B 15/02 | (2006.01) |
| G05B 13/02 | (2006.01) |

(52) U.S. Cl.
CPC ..... G05B 23/0221 (2013.01); G05B 13/0265 (2013.01); G05B 15/02 (2013.01); G06N 20/00 (2019.01); G05B 2223/02 (2018.08)

(58) Field of Classification Search
CPC ........................ G05B 23/0221; G05B 13/0265; G05B 15/02; G05B 2223/02; G06N 20/00
See application file for complete search history.

(56) References Cited

U.S. PATENT DOCUMENTS

| 2020/0125819 A1* | 4/2020 | Gross | G06F 11/0709 |
| 2020/0151618 A1* | 5/2020 | Gross | G06N 20/00 |
| 2020/0322703 A1* | 10/2020 | Bures | G06N 20/00 |

FOREIGN PATENT DOCUMENTS

| CN | 110807515 A | * | 2/2020 | ........... G06N 3/0445 |
| WO | WO-2016151494 A1 | * | 9/2016 | |

OTHER PUBLICATIONS

Baclawski et al., "Self-Adaptive Dynamic Decision Making Processes,". In IEEE Conference on Cognitive and Computational Aspects of Situation Management, 2017, 7 pages.

* cited by examiner

*Primary Examiner* — Catherine T. Rastovski
*Assistant Examiner* — Yossef Korang-Beheshti
(74) *Attorney, Agent, or Firm* — Kilpatrick Townsend & Stockton LLP

(57) ABSTRACT

The disclosed embodiments relate to a system that automatically adapts a prognostic-surveillance system to account for aging phenomena in a monitored system. During operation, the prognostic-surveillance system is operated in a surveillance mode, wherein a trained inferential model is used to analyze time-series signals from the monitored system to detect incipient anomalies. During the surveillance mode, the system periodically calculates a reward/cost metric associated with updating the trained inferential model. When the reward/cost metric exceeds a threshold, the system swaps the trained inferential model with an updated inferential model, which is trained to account for aging phenomena in the monitored system.

19 Claims, 5 Drawing Sheets

AUTOMATICALLY ADAPTING A PROGNOSTIC-SURVEILLANCE SYSTEM TO ACCOUNT FOR AGE-RELATED CHANGES IN MONITORED ASSETS

BACKGROUND

Field

The disclosed embodiments generally relate to techniques for using machine-learning (ML) models to perform prognostic-surveillance operations based on time-series sensor signals from monitored assets. More specifically, the disclosed embodiments relate to a technique for automatically adapting an ML-based prognostic-surveillance system to account for age-related changes in monitored assets.

Related Art

Large numbers of sensors are presently being deployed to monitor the operational health of critical assets in a large variety of business-critical systems. For example, a medium-sized computer data center can include over 1,000,000 sensors monitoring thousands of servers, a modern passenger jet can include 75,000 sensors, an oil refinery can include over 1,000,000 sensors, and even an ordinary car can have over 100 sensors. These sensors produce large volumes of time-series sensor data, which can be used to perform prognostic-surveillance operations to facilitate detecting incipient anomalies. This makes it possible to take remedial action before the incipient anomalies develop into failures in the monitored assets.

ML-based prognostic-surveillance techniques typically operate by training an ML model (also referred to as an "inferential model") to learn correlations among time-series signals. The trained ML model is then placed in a surveillance mode where it used to predict values for time-series signals based on the correlations with other time-series signals, wherein deviations between actual and predicted values for the time-series signals trigger alarms that indicate an incipient anomaly. This makes it possible to perform remedial actions before the underlying cause of the incipient anomaly leads to a catastrophic failure.

ML-based prognostic-surveillance techniques operate by learning patterns in signals when there is no degradation present in the monitored assets, and subsequently detecting anomalies in those patterns during normal system operation. A challenge arises in use cases where the assets under surveillance experience aging phenomena during the lifetime of the assets, especially when the aging mechanisms result in changes in correlations among the monitored signals. For such use cases, where the aging of assets is normal and expected and is not indicative of impending failures, there is often a problem associated with nuisance alarms, which are triggered because aging mechanisms in the assets cause changes in the correlations among time-series signals from the assets.

Machines and complex systems typically evolve over time, and it is naïve to assume that the machines and complex systems will always behave according to unchanging patterns. This is because machines and complex systems adapt and evolve in numerous ways. For example, machines wear out or can be upgraded. Hence, it is desirable to provide a prognostic-surveillance system that can adapt to changing characteristics of monitored assets, particularly in cases where the changes are concomitant with normal, expected aging phenomena for the monitored assets, and there exist no anomalies or degradation in those assets.

A number of "adaptive" analytical systems have been developed in the past. For example, feedback control (FC) theory is a well-established engineering discipline, and there exist adaptive FC systems that modify feedback parameters when necessary to achieve a specific goal. An even more elaborate adaptation technique involves completely restructuring the FC system, not just the feedback parameters. At the same time, machine-learning (ML) techniques have greatly improved in recent years and are finding many new applications. However, ML techniques are not yet capable of "autonomous adaptation." A conventional ML technique presumes that there exists a collection of data (usually a very large collection), which is available for training an ML model. After the ML model is trained, it can be used to make decisions based on new data.

Most conventional ML techniques can only adapt by training a new model. Some ML techniques, such as reinforcement learning, explicitly modify the ML model in response to feedback. However, reinforcement learning still presumes that the associated monitored asset operates according to a fixed behavior. This can be problematic because the monitored asset's behavior may change or evolve over time due to age-related processes.

Hence, what is needed is a prognostic-surveillance system that adapts to age-related changes in monitored assets.

SUMMARY

The disclosed embodiments relate to a system that automatically adapts a prognostic-surveillance system to account for aging phenomena in a monitored system. During operation, the prognostic-surveillance system is operated in a surveillance mode, wherein a trained inferential model is used to analyze time-series signals from the monitored system to detect incipient anomalies. During the surveillance mode, the system periodically calculates a reward/cost metric associated with updating the trained inferential model. When the reward/cost metric exceeds a threshold, the system swaps the trained inferential model with an updated inferential model, which is trained to account for aging phenomena in the monitored system.

In some embodiments, operating the prognostic-surveillance system in the surveillance mode involves: (1) using the trained inferential model to generate estimated values for the time-series signals from the monitored system based on cross-correlations between the time-series signals; (2) performing pairwise differencing operations between actual values and the estimated values for the time-series signals set to produce residuals; and (3) analyzing the residuals to detect the incipient anomalies in the monitored system.

In some embodiments, analyzing the residuals involves: performing a sequential probability ratio test (SPRT) on the residuals to produce SPRT alarms; and detecting the incipient anomalies based on the SPRT alarms.

In some embodiments, the reward/cost metric balances an advantage gained by swapping the trained inferential model against a cost associated with the swapping operation.

In some embodiments, the advantage gained by swapping the trained inferential model includes: reducing a number of false alarms that can possibly take the monitored asset out of service; and increasing a sensitivity of the prognostic-surveillance system associated with detecting new degradation modes.

In some embodiments, the cost associated with the swapping operation includes model-retraining costs and model-swapping costs.

In some embodiments, during a preceding training mode, the system runs the monitored system in a programmable environmental testing chamber to produce training data. Next, the system uses the training data to parametrically train the inferential model across a range of ambient conditions with input from a subject matter expert, so that the trained inferential model is able to discriminate between normal aging phenomena and degradation modes that lead to system failure.

In some embodiments, during a preceding training mode, the system uses age-specific data historian files, which contain time-series signals for similar monitored systems during different stages in life-cycles of the similar systems, to train a set of age-specific inferential models for the monitored system, wherein each trained age-specific inferential model is associated with different age-specific operational characteristics of the monitored system.

In some embodiments, when the prognostic-surveillance system detects an incipient anomaly in the monitored system, a servicing operation is performed on the monitored system to remediate the anomaly.

In some embodiments, performing the servicing operation comprises one of the following: performing an airflow-reversal operation to remove accumulated dust from components in a coal-fired power plant; replacing one or more blades in a metal stamping press; and replacing cooling fans in an enterprise computing system.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Exemplary Prognostic-Surveillance System

Figure 1:
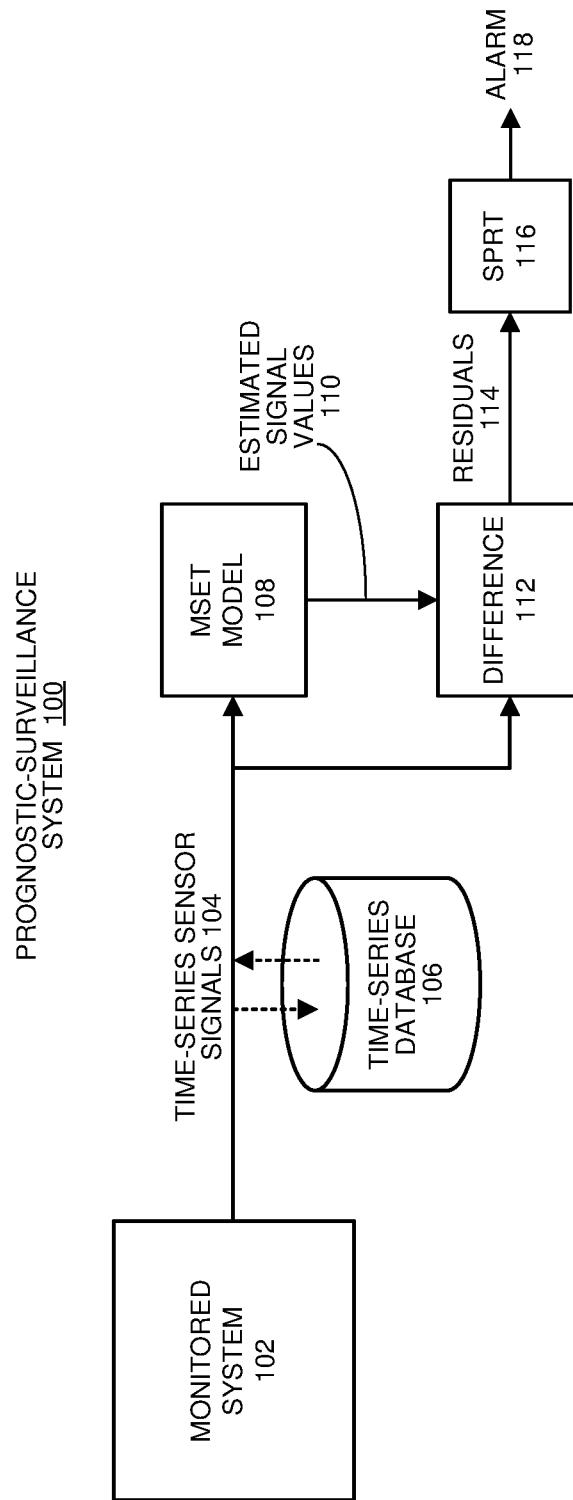
FIG. 1 illustrates an exemplary prognostic-surveillance system in accordance with the disclosed embodiments.

Before describing the adaptive prognostic-surveillance system further, we first describe an exemplary non-adaptive MSET-based prognostic-surveillance system. FIG. 1 illustrates an exemplary non-adaptive prognostic-surveillance system 100 that accesses a time-series database 106, containing time-series signals in accordance with the disclosed embodiments. As illustrated in FIG. 1, prognostic-surveillance system 100 operates on a set of time-series sensor signals 104 obtained from sensors in a monitored system 102. Note that monitored system 102 can generally include any type of machinery or facility, which includes sensors and generates time-series signals. Moreover, time-series signals 104 can originate from any type of sensor, which can be located in a component in monitored system 102, including: a voltage sensor; a current sensor; a pressure sensor; a rotational speed sensor; and a vibration sensor.

During operation of prognostic-surveillance system 100, time-series signals 104 can feed into a time-series database 106, which stores the time-series signals 104 for subsequent analysis. Next, the time-series signals 104 either feed directly from monitored system 102 or from time-series database 106 into a multivariate state estimation technique (MSET) pattern-recognition model 108. Although it is advantageous to use an inferential model, such as MSET, for pattern-recognition purposes, the disclosed embodiments can generally use any one of a generic class of pattern-recognition techniques called nonlinear, nonparametric (NLNP) regression, which includes neural networks, support vector machines (SVMs), auto-associative kernel regression (AAKR), and even simple linear regression (LR).

Next, MSET model 108 is "trained" to learn patterns of correlation among all of the time-series signals 104. This training process involves a one-time, computationally intensive computation, which is performed offline with accumulated data that contains no anomalies. The pattern-recognition system is then placed into a "real-time surveillance mode," wherein the trained MSET model 108 predicts what each signal should be, based on other correlated variables; these are the "estimated signal values" 110 illustrated in FIG. 1. Next, the system uses a difference module 112 to perform a pairwise differencing operation between the actual signal values and the estimated signal values to produce residuals 114. The system then performs a "detection operation" on the residuals 114 by using SPRT module 116 to detect anomalies and possibly to generate an alarm 118. (For a description of the SPRT model, please see Wald, Abraham, June 1945. "Sequential Tests of Statistical Hypotheses." *Annals of Mathematical Statistics*. 16 (2): 117-186.) In this way, prognostic-surveillance system 100 can proactively alert system operators to incipient anomalies, such as impending failures, hopefully with enough lead time so that such problems can be avoided or proactively fixed.

Figure 2:
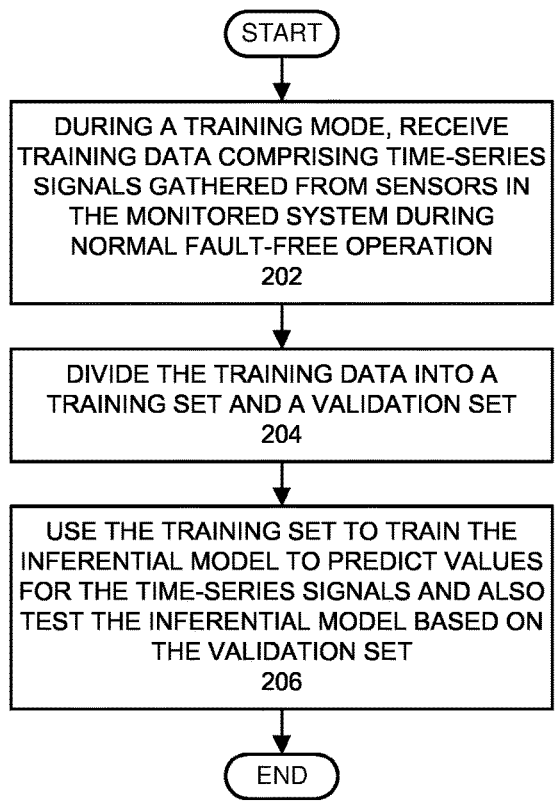
FIG. 2 presents a flow chart illustrating a process for training an inferential model in accordance with the disclosed embodiments.
Figure 3:
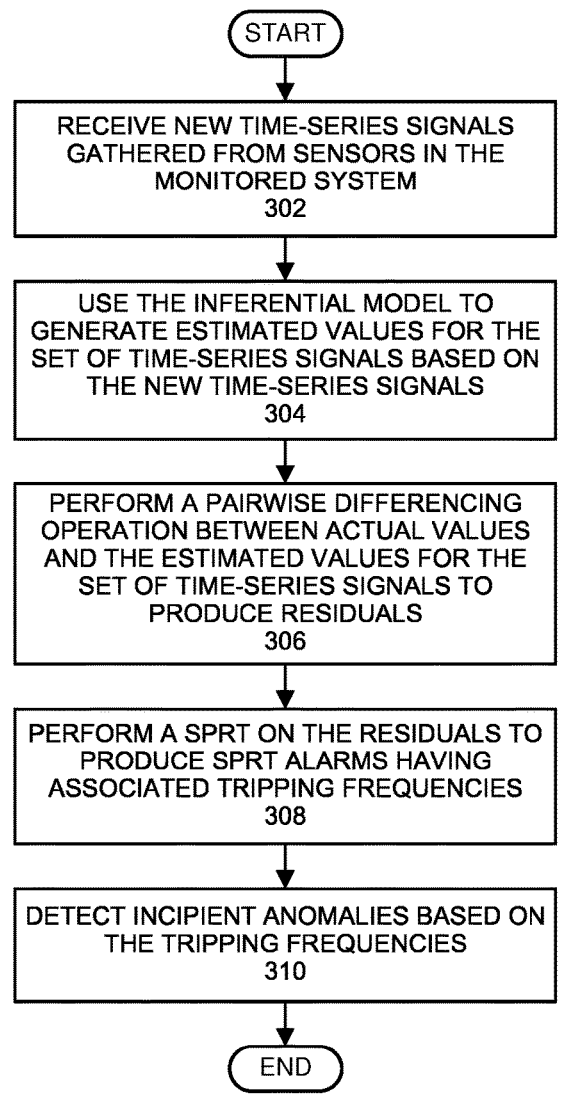
FIG. 3 presents a flow chart illustrating a process for using an inferential model to perform prognostic-surveillance operations in accordance with the disclosed embodiments.

The prognostic surveillance system 100 illustrated in FIG. 1 operates generally as follows. During a training mode, which is illustrated in the flow chart in FIG. 2, the system receives a training set comprising time-series signals gathered from sensors in the monitored system under normal fault-free operation (step 202). Next, the system divides the training data into a training set and a validation set (step 204). The system then trains the inferential model to predict values of the time-series signals based on the training set, and also tests the inferential model based on the validation set (step 206). During a subsequent surveillance mode, which is illustrated by the flow chart in FIG. 3, the system receives new time-series signals gathered from sensors in the monitored system (step 302). Next, the system uses the inferential model to generate estimated values for the set of time-series signals based on the new time-series signals (step 304). The system then performs a pairwise differencing operation between actual values and the estimated values for the set of time-series signals to produce residuals (step 306). The system then analyzes the residuals to detect the incipient anomalies in the monitored system. This involves performing a SPRT on the residuals to produce SPRT alarms with associated tripping frequencies (step 308), and then detecting incipient anomalies based on the tripping frequencies (step 310). Note that these incipient anomalies can be associated with an impending failure of the monitored system, or a malicious-intrusion event in the monitored system.

Discussion

Figure 4:
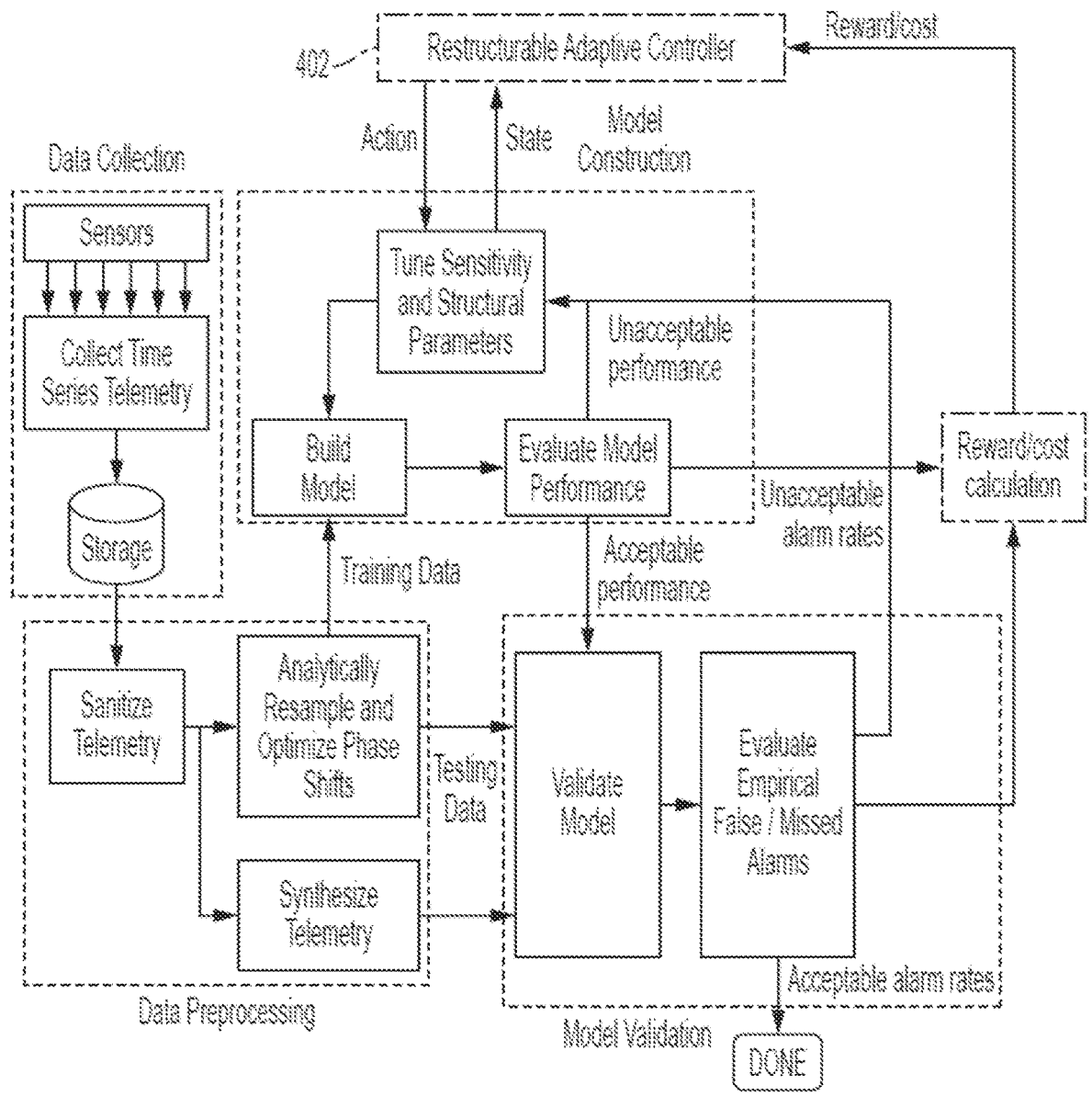
FIG. 4 illustrates a prognostic-surveillance system with a restructurable adaptive controller in accordance with the disclosed embodiments.

The disclosed system provides a new approach to prognostic surveillance, wherein an ML-based monitoring technique generates and continuously updates a reward/cost metric. As is illustrated in FIG. 4, this reward/cost metric is monitored by a restructurable adaptive (RA) controller 402, which is implemented in an "external loop" from the primary ML-based execution path, which is performing monitoring operations to detect prognostic anomalies. This external RA controller makes decisions about when to autonomously update the inferential model used by the prognostic-surveillance system. For such updates, the RA controller swaps in a new training module for the age-specific performance of the monitored asset. This swapping process can take place quickly (in the background, between time steps for the prognostic-surveillance system).

Our new "adaptable MSET" (AMSET) technique achieves an extremely high prognostic accuracy throughout the lifetime of the monitored assets while attempting to minimize downtime, thereby significantly reducing overall operational and maintenance costs. (Although the specific adaptive ML technique used in the disclosed embodiments is based on the Multivariate State Estimation Technique (MSET), other multivariate ML techniques can also be modified to be adaptive.)

The RA controller 402 illustrated in FIG. 4 seeks to update the model at optimal times when changes in the monitored assets are consistent with aging effects. This new RA-controller-based technique for ML-based prognostic surveillance provides two main advantages: (1) it largely eliminates false alarms resulting from normal aging phenomena; and (2) it facilitates extremely high sensitivity for detecting new degradation modes in aging systems. (In contrast, prior art systems had to "loosen their thresholds" so as not to trigger false alarms caused by aging phenomena, which makes the prior art systems less sensitive to detecting new degradation modes.)

There exist a number of use cases in which the use of ML-based prognostics is problematic because of "aging related" changes in the state of the monitored assets. Service personnel do not like to receive prognostic alerts from the "anomaly detection" techniques, which cause them to shut down a revenue-generating asset to perform servicing operations only to discover that the prognostic alerts were caused by normal aging of the asset, and not by an actual degradation mechanism potentially leading to system failure.

We now provide three examples from different industries in which the new AMSET approach can effectively deal with the challenges of applying ML-based prognostics to monitored assets that change their signal correlation patterns due to known aging mechanisms.

Dust Fouling in Flow Channels for Utility Coal Plants

A typical coal-fired power plant consumes large volumes of coal each day. This large volume of coal requires enormous volumes of airflow (typically exceeding 1 million cubic-feet per minute) to ensure efficient oxidation in a large combustion chamber. Because the large volume of coal is first pulverized into a powder to facilitate efficient combustion, there is a lot of dust buildup in flow channels and spacer-grids located on the upstream side of the combustion chamber, and buildup of flue-ash deposits in flow channels located on the downstream side of the combustion chamber. This dust buildup causes flow impedance, which steadily increases throughout the day. This dust buildup also causes airflow pumping requirements to increase throughout the day, which diminishes overall plant energy efficiency.

To "rejuvenate" the flow channels and restore air-inlet flow velocities on the inlet side of the combustion chamber and flue-gas exhaust flow velocities on the outlet side, it is necessary to periodically (e.g., once every 6-9 hours) shut down the combustion process and reverse the fans. The large reverse airflow blows the accumulated dust-dross off of the metal grills, spacer-grids and other components, which restores normal airflow efficiency throughout the system. However, the flow-reversal process comes with a cost because the combustion must be shut down for several minutes. On the other hand, performing the flow-reversal process too infrequently also has a cost due to increased pumping effort, and from diminished air flow rates that cause lower-efficiency combustion.

The decision about when to reverse the airflow presently depends on human operators, who watch flow-rate gauges and pressure gauges associated with the combustion chamber, and combustion temperatures that provide an indirect measure of combustion efficiency, and then make a subjective decision to the reverse the airflow. However, the human subjectivity involved in deciding how frequently to reverse the airflow causes measurable variations in overall coal-plant efficiency.

Some newer coal plants use ML-based techniques to minimize the human subjectivity involved in picking the best times to reverse airflow. This is definitely an improvement, but these existing ML-based techniques have shortcomings. As the overall airflow impedance increases monotonically throughout the day, this "rapid-aging" process deteriorates air and exhaust flow rates and diminishes combustion efficiency. This means that an ML-based prognostic technique, which is deployed to monitor multiple sensors throughout the coal plant to detect the onset of degradation in various components (or in associated sensors), has to accommodate a monotonic deterioration in the multivariate relationships among the monitored variables as the aging process progresses throughout the day.

If an ML-based technique is trained on time-series signals from the monitored asset immediately after a "rejuvenation" event, when conditions are close to ideal, then anomaly-detection alarms will be triggered over time as air and exhaust flow rates diminish, combustion efficiency suffers, temperatures decrease, and associated steam-generation rates decline. Hence, the ML-based prognostic-surveillance technique must be adjusted to have looser sensitivity so that it does not trigger alarms during the normal aging and regenerating cycles.

Our new system provides a better approach for ML prognostics by maintaining near-optimal anomaly detection sensitivity throughout the aging and regenerating cycles. We do this by training separate inferential models for: (1) a newly rejuvenated plant condition; (2) a dirty-plant condition where the airflow and exhaust-flow impedances reach maximum values, and (3) other conditions between these two extremes.

Our new system starts with an initial trained model that provides optimal prognostics at the beginning of a cycle (right after a flow-reversal event), and then updates the model throughout the operating cycle of the plant (as dust buildup diminishes the flow rates) until the next rejuvenation flow-reversal operation is conducted. This new approach, which incrementally updates the trained model from a library of stored trained models, facilitates near-optimal anomaly detection sensitivity throughout the aging and regeneration cycles.

Advanced Manufacturing Metal Stamping Operations

Metal stamping operations are commonly performed in various manufacturing industries. These metal stamping operations make use of dies and stamping presses to transform sheet metal (through a cold-forming process) into shapes needed for metal parts, which are assembled into components and subsystems.

Metal stamping systems resemble automated "cookie-cutters," which stamp out metal parts at very high rates (up to 1,500 strokes per minute) on a 24/7 basis. When a high-capacity metal stamping press breaks down, it can cause a costly disruption for an associated manufacturing process. Fortunately, ML-based prognostic-surveillance techniques can be used to proactively detect anomalies in assets and associated sensors in a manufacturing plant. However, it can be challenging to use these prognostic-surveillance techniques because there exists a rapid aging process for metal stamping machines that gradually deteriorates the performance of associated metal stamping operations.

This aging process has to do with the sharpness versus dullness of the dies that are used to cut the metal into parts. When a metal stamping press starts with brand new dies, the high capacity motors that drive the press cycles encounter only modest resistance during the stroke cycle, and the resulting stamped parts have very smooth edges, which is desirable in subsequent phases of the associated manufacturing and assembly process.

However, with up to 1,500 strokes per minute, the "sharpness" of the die blades degrades throughout the day. As the die blades become increasingly more dull, a gradually increasing amount of force is required with every stroke cycle of the press. This also causes a deterioration in the quality of the stamped components, because of burrs on edges of the components. This monotonic aging process can cause accelerated failure rates for expensive metal stamping assets; this causes downtime while increasing costly "scrap rates" for stamped parts with burrs and other imperfections. Note that there also exists a cost for stopping manufacturing throughput to swap dull die blades for sharp ones. However, the cost can be larger if swaps are delayed, which increases the likelihood of failure of the stamping machine and elevates scrap rates.

If we train the ML model to monitor sensors immediately after new sharp dies are installed, then the correlations among the resulting time-series signals change during the aging process. Hence, the ML-based prognostic-surveillance technique must be adjusted to have looser sensitivity, so that it does not trigger alarms due to the normal aging and regenerating cycles that occur as the die blades become dull.

A much better approach for ML prognostics, which maintains near-optimal anomaly detection sensitivity throughout the aging and regenerating cycles, is to train multiple inferential models: one model for a new, sharp die condition, one model for a dull die condition, and multiple models for other intermediate conditions. As the aging phenomena progresses and the dullness of the die blades increases, our system swaps in new pre-trained modules. (Note that training operations for inferential models are quite time-consuming, whereas a pre-trained model can be swapped in almost instantaneously.) By swapping in new inferential models as aging progresses, our new adaptable ML-based prognostic-surveillance system maintains high sensitivity for detecting the onset of new degradation modes in the assets and associated sensors throughout the aging cycles that are characteristic of high-throughput metal stamping operations.

Feedback-Control Mechanism for Cooling a Datacenter

Figure 5:
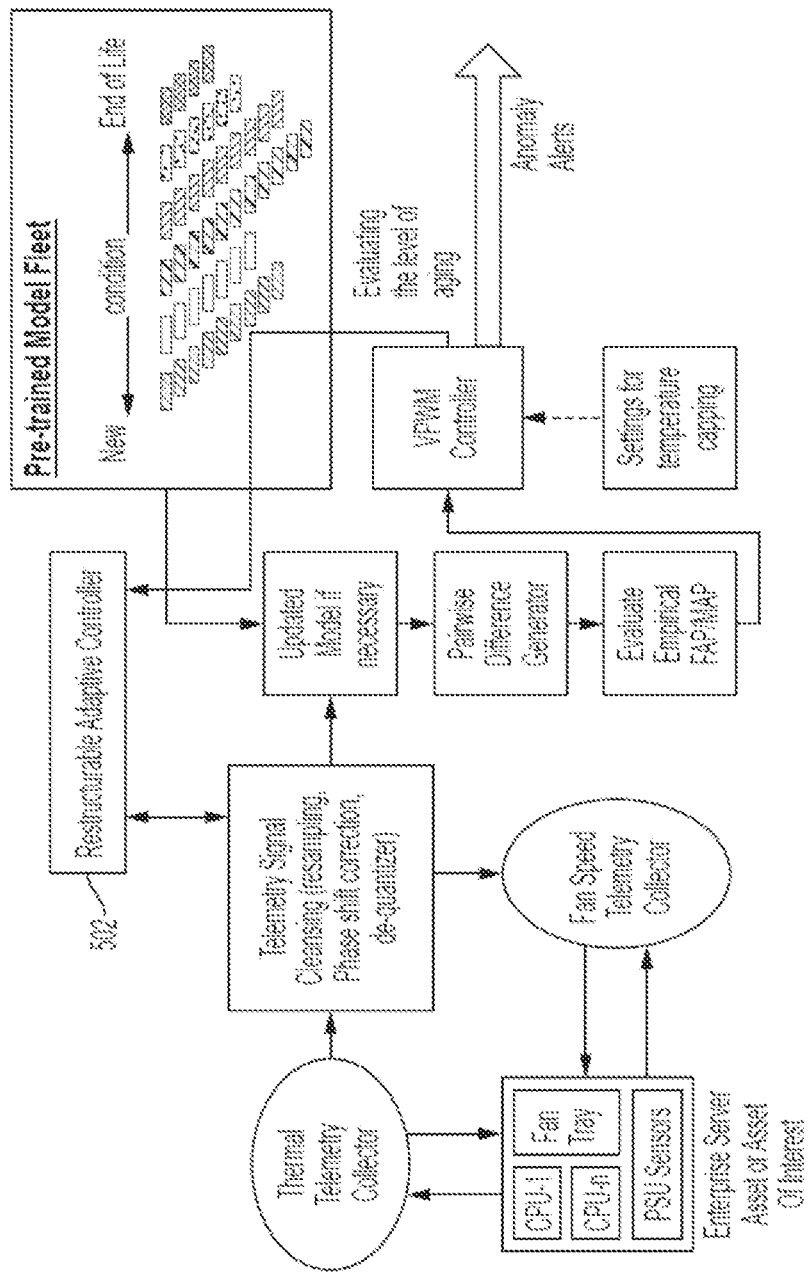
FIG. 5 presents a diagram of an adaptable MSET system for a datacenter use case in accordance with the disclosed embodiments.

As a complex asset ages, a number of factors can cause an associated air-based or fluid-based cooling system to become less efficient. FIG. 5 presents an illustrative use case for AMSET in a cooling system for datacenter assets. Existing ML-based prognostic surveillance techniques in a datacenter operate by training an inferential model MSET when a server is new. This trained inferential model is subsequently used to perform monitoring operations throughout the life of the server. However, servers can last a number of years and there exist various aging mechanisms in mechanical systems associated with servers that can cause the efficiency of associated "temperature capping" techniques to deteriorate.

Temperature capping techniques are used in datacenters where there exist components, such as CPUs, that cannot exceed a maximum temperature (e.g., 85° C.) for reliability reasons. Otherwise, if this maximum temperature is exceeded, the system will trigger a "thermal shutdown" to protect internal components. In this type of system, a prognostic-surveillance system is used to detect anomalies and send associated service alerts, and otherwise adjust fan speeds to maintain internal CPU temperatures below the 85° C. maximum temperature (hence, the term "temperature capping").

The problem with conventional prognostic-surveillance techniques is that an inferential model is trained on a new system, but mechanical aging phenomena gradually creep in with age and deteriorate the overall energy efficiency for older versus newer assets. These aging phenomena also change the correlation patterns among the time-series signals that conventional prognostic-surveillance systems use to detect anomalous behavior.

For cooling systems in enterprise computing systems, examples of the internal aging phenomena include: (1) mechanical wear that causes bearing out-of-roundness in fan motors, which increases friction; (2) dust buildup on heat-sink fins that reduces thermal dissipation efficiency; (3) gradual lubrication dry-out in rotating fan assemblies that causes friction; and (4) gaskets and O-rings that gradually deteriorate with age, which accelerates warm-air/cool-air leakage mechanisms in high-flow channels and thereby diminishes overall cooling efficiency.

Note that none of these normal aging mechanisms is an indication that the server is undergoing degradation that will lead to a failure. However, if an inferential model is trained on a new system, anomaly alarms will be generated as a result of these aging mechanisms, and these alarms can take revenue-generating assets out of service unnecessarily. Moreover, unnecessary service requests can be generated, which can lead to costly and unnecessary service actions.

Our new adaptive prognostic-surveillance system (illustrated in FIG. 5) reduces these availability and servicing costs by proactively discriminating between normal aging phenomena and system degradation events, and autonomously "swapping in" updated age-specific inferential models at appropriate times throughout the life of the assets under surveillance, thereby mitigating the above-described problems.

In some embodiments, our new adaptable MSET technique is incorporated into a software module, which is "insertable" into an existing ML framework within a datacenter or cloud computing system. By saying this software module is "insertable," we mean that the software module can be easily uploaded and/or patched in an existing ML framework—as opposed to having to totally replace the ML software simply to upgrade to AMSET capabilities. In this way, our new adaptable MSET technique can be easily deployed in such systems.

In this datacenter use case, our system maintains a library of pre-trained inferential age-specific models (not just one ML model that was trained on a new asset). This library of pre-trained age-specific models can be populated using one of the following two techniques.

For new assets that are the "first ever" make and model of the asset (for which there are no aged assets in the field), parametric training can be conducted in a programmable environmental testing chamber. This makes it possible to provide exhaustive parametric coverage for all possible ambient conditions (e.g., ambient temperatures, vibration levels, relative humidity levels, atmospheric pressures, and altitudes). Note that for air-cooled and fluid-cooled assets, all of these ambient conditions affect operating and performance efficiency. By systematically training our prognostic-surveillance system over all possible permutations and combinations of ambient conditions, while simultaneously exercising the asset through its full performance range, our prognostic-surveillance system learns the "state" of the asset over all possible conditions. In this way, our new prognostic-surveillance system can become robust with respect to discriminating between normal aging phenomena and the onset of degradation mechanisms.

For older assets, which have been in service for a period of time, we can produce a library of trained age-specific models that can be periodically swapped in as the asset ages. As the population of assets in the field reaches the age of one-month, two-months, . . . , one-year, two-years in "power-on hours" (POH), the associated telemetry is continuously stored in a master database of age-specific data historian files, which are continuously analyzed and labeled for assets that experience no serviceability problems. Telemetry from this data historian database can be used to build a comprehensive library of "age-specific" trained inferential models. Note that training "compute cost" overhead is of no concern here, because all of the training computations can be conducted off-line in the background.

Over time, this training process builds up a highly populated "logical fleet" of pre-trained ML models associated with non-degraded-but-aged assets. Referring to FIG. 5, RA controller 502 starts by operating on a newly installed asset. During operation, it tracks the "inferred age" of the monitored asset and swaps in an appropriate pre-trained age-specific model from the library as the age of the monitored asset evolves over time.

Our new system is the first aging-robust ML-based prognostic-surveillance system that provides "age-aware" prognostics throughout the lifetime of a monitored asset by using a restructurable adaptive controller to autonomously adapt the prognostics to the age of the monitored asset. In this way, our new system ensures high sensitivity for detecting incipient anomalies by disambiguating degradation alerts from normal aging phenomena throughout the life of the monitored asset.

Process of Producing Synthetic Signals

Figure 6:
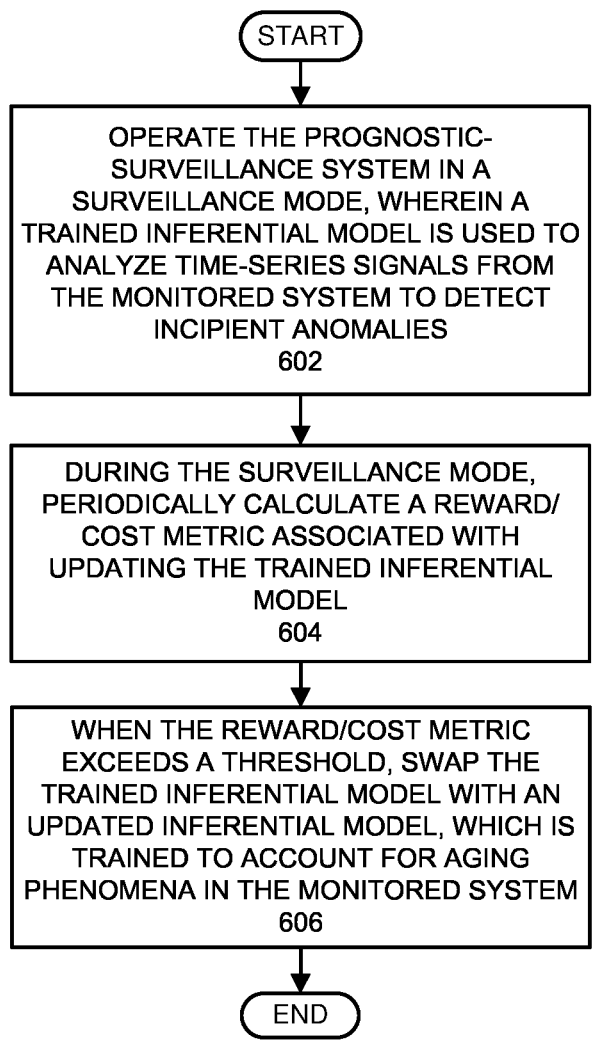
FIG. 6 presents a flow chart illustrating a process for automatically adapting a prognostic-surveillance system to account for aging phenomena in a monitored system in accordance with the disclosed embodiments.

FIG. 6 presents a flow chart illustrating a process for automatically adapting a prognostic-surveillance system to account for aging phenomena in a monitored system in accordance with the disclosed embodiments. During operation, the prognostic-surveillance system is operated in a surveillance mode, wherein a trained inferential model is used to analyze time-series signals from the monitored system to detect incipient anomalies (step 602). During this surveillance mode, the system periodically calculates a reward/cost metric associated with updating the trained inferential model (step 604). When the reward/cost metric exceeds a threshold, the system swaps the trained inferential model with an updated inferential model, which is trained to account for aging phenomena in the monitored system (step 606).

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for automatically adapting a prognostic-surveillance system to account for aging phenomena in a monitored system, the prognostic-surveillance system comprising one or more machine-learning models, the method comprising:

receiving time-series signals associated with measurements obtained at one or more sensors in the monitored system;

analyzing, using a trained inferential machine-learning model, the time-series signals to detect incipient anomalies associated with the monitored system;

periodically determining a reward/cost metric associated with using an additional trained inferential machine-learning model trained to account for aging phenomena in the monitored system;

responsive to determining that the reward/cost metric exceeds a threshold, using the additional trained inferential machine-learning model to account for one or more aging phenomena in the monitored system;

using the additional trained inferential machine-learning model in the prognostic-surveillance system;

detecting, by the prognostic-surveillance system and using the additional trained inferential learning model, an incipient anomaly in the monitored system; and in response to the detecting, performing a servicing operation on the monitored system to remediate the incipient anomaly.

2. The method of claim 1, wherein the method further comprises:

using the trained inferential machine-learning model to generate estimated values for the time-series signals from the monitored system based on cross-correlations between the time-series signals;

performing pairwise differencing operations between actual values and the estimated values for the time-series signals set to produce residuals; and analyzing the residuals to detect the incipient anomalies in the monitored system.

3. The method of claim 2, wherein analyzing the residuals involves:

performing a sequential probability ratio test (SPRT) on the residuals to produce SPRT alarms; and detecting the incipient anomalies based on the SPRT alarms.

4. The method of claim 1, wherein the reward/cost metric balances an advantage gained by swapping the trained inferential machine-learning model against a cost associated with the swapping.

5. The method of claim 4, wherein the advantage gained by swapping the trained inferential machine-learning model includes: reducing a number of false alarms that can possibly take the monitored system out of service; and increasing a sensitivity of the prognostic-surveillance system associated with detecting new degradation modes; and wherein the cost associated with the swapping the trained inferential machine-learning model with the additional trained inferential machine-learning model includes model-retraining costs and model-swapping costs.

6. The method of claim 1, wherein the method further comprises:

running the monitored system in a programmable environmental testing chamber to produce training data; and using the training data to parametrically train the inferential machine-learning model across a range of ambient conditions with input from a subject matter expert, so that the trained inferential machine-learning model is able to discriminate between normal aging phenomena and degradation modes that lead to system failure.

7. The method of claim 1, wherein the method further comprises training a set of age-specific machine-learning inferential models for the monitored system using age-specific data historian files, which contain time-series signals for similar monitored systems during different stages in life-cycles of the similar monitored systems, wherein each trained age-specific inferential machine-learning model is associated with different age-specific operational characteristics of the monitored system.

8. The method of claim 1, wherein performing the servicing operation comprises one or more of the following:

performing an airflow-reversal operation to remove accumulated dust from components in a coal-fired power plant;

replacing one or more blades in a metal stamping press; and replacing cooling fans in an enterprise computing system.

9. The method of claim 1, wherein periodically determining the reward/cost metric and selectively swapping the trained inferential machine-learning model are performed by an insertable software module that can be easily inserted into an existing ML framework without having to replace an entire ML framework.

10. A non-transitory computer-readable storage medium storing instructions that when executed by a computer cause the computer to perform operations for automatically adapting a prognostic-surveillance system to account for aging phenomena in a monitored system, the prognostic-surveillance system comprising one or more machine-learning models, the operations comprising:

receiving time-series signals associated with measurements obtained at one or more sensors in the monitored system;

analyzing, using a trained inferential machine-learning model, the time-series signals to detect incipient anomalies associated with the monitored system;

periodically determining a reward/cost metric associated with using an additional trained inferential machine-learning model trained to account for aging phenomena in the monitored system;

responsive to determining that the reward/cost metric exceeds a threshold, using with the additional trained inferential machine-learning model to account for one or more aging phenomena in the monitored system;

using the additional trained inferential machine-learning model in the prognostic-surveillance system;

detecting, by the prognostic-surveillance system and using the additional trained inferential learning model, an incipient anomaly in the monitored system; and in response to the detecting, performing a servicing operation on the monitored system to remediate the incipient anomaly.

11. The non-transitory computer-readable storage medium of claim 10, wherein the operations further comprises:

using the trained inferential machine-learning model to generate estimated values for the time-series signals from the monitored system based on cross-correlations between the time-series signals;

performing pairwise differencing operations between actual values and the estimated values for the time-series signals set to produce residuals; and analyzing the residuals to detect the incipient anomalies in the monitored system.

12. The non-transitory computer-readable storage medium of claim 11, wherein analyzing the residuals involves:

performing a sequential probability ratio test (SPRT) on the residuals to produce SPRT alarms; and detecting the incipient anomalies based on the SPRT alarms.

13. The non-transitory computer-readable storage medium of claim 10, wherein the reward/cost metric balances an advantage gained by swapping the trained inferential machine-learning model against a cost associated with the swapping.

14. The non-transitory computer-readable storage medium of claim 13,
wherein the advantage gained by swapping the trained inferential machine-learning model includes: reducing a number of false alarms that can possibly take the monitored system out of service; and increasing a sensitivity of the prognostic-surveillance system associated with detecting new degradation modes; and
wherein the cost associated with the swapping includes model-retraining costs and model-swapping costs.

15. The non-transitory computer-readable storage medium of claim 10, wherein the operations further comprise:
running the monitored system in a programmable environmental testing chamber to produce training data; and
using the training data to parametrically train the inferential machine-learning model across a range of ambient conditions with input from a subject matter expert, so that the trained inferential machine-learning model is able to discriminate between normal aging phenomena and degradation modes that lead to system failure.

16. The non-transitory computer-readable storage medium of claim 10, wherein the operations further comprise training a set of age-specific machine-learning inferential models for the monitored system using age-specific data historian files, which contain time-series signals for similar monitored systems during different stages in lifecycles of the similar monitored systems, wherein each trained age-specific inferential model is associated with different age-specific operational characteristics of the monitored system.

17. The non-transitory computer-readable storage medium of claim 10, the operations further comprising:
responsive to detecting the incipient anomaly in the monitored system, performing a servicing operation on the monitored system to remediate the anomaly.

18. A prognostic-surveillance system for monitoring a monitored system, the prognostic-surveillance system comprising:
a non-transitory computer-readable medium storing computer-executable program instructions; and
a processing device communicatively coupled to the non-transitory computer-readable medium for executing the computer-executable program instructions, wherein executing the computer-executable program instructions configures the processing device to perform operations comprising:
receiving time-series signals associated with measurements obtained at one or more sensors in the monitored system;
analyzing, using a trained inferential machine-learning model, the time-series signals to detect incipient anomalies associated with the monitored system;
periodically determining a reward/cost metric associated with using an additional trained inferential machine-learning model trained to account for aging phenomena in the monitored system;
responsive to determining that the reward/cost metric exceeds a threshold, using the additional trained inferential machine-learning model to account for one or more aging phenomena in the monitored system;
using the additional trained inferential machine-learning model in the prognostic-surveillance system;
detecting, by the prognostic-surveillance system and using the additional trained inferential learning model, an incipient anomaly in the monitored system; and
in response to the detecting, performing a servicing operation on the monitored system to remediate the incipient anomaly.

19. The prognostic-surveillance system of claim 18, wherein the reward/cost metric balances an advantage gained by swapping the trained inferential machine-learning model against a cost associated with the swapping.

* * * * *